United States Patent [19]

Vaughan

[11] 4,405,420
[45] Sep. 20, 1983

[54] CATALYZED ELECTROCHEMICAL GASIFICATION OF CARBONACEOUS MATERIALS AT ANODE AND ELECTROWINNING OF METALS AT CATHODE

[75] Inventor: Ronald J. Vaughan, Orinda, Calif.

[73] Assignee: Chevron Research Company, San Francisco, Calif.

[21] Appl. No.: 305,877

[22] Filed: Sep. 28, 1981

[51] Int. Cl.³ .......................... C25C 1/06; C25C 1/08; C25C 1/10; C25C 1/12
[52] U.S. Cl. .......................... 204/105 M; 204/105 R; 204/106; 204/109; 204/112; 204/114; 204/120; 204/108
[58] Field of Search .............. 204/105 R, 105 M, 121, 204/106, 108, 109, 112, 114, 120

[56] References Cited

U.S. PATENT DOCUMENTS 3,761,369  9/1973  Tirrell ................................. 204/108
4,268,363  5/1981  Coughlin ......................... 204/105 R Primary Examiner—R. L. Andrews
Attorney, Agent, or Firm—D. A. Newell; J. M. Whitney; V. J. Cavalieri

[57] ABSTRACT

The electrochemical gasification reaction of carbonaceous materials by anodic oxidation in an aqueous acidic electrolyte to produce oxides of carbon at the anode and metallic elements at the cathode of an electrolysis cell is catalyzed by the use of an iron catalyst.

10 Claims, No Drawings

CATALYZED ELECTROCHEMICAL GASIFICATION OF CARBONACEOUS MATERIALS AT ANODE AND ELECTROWINNING OF METALS AT CATHODE

BACKGROUND OF THE INVENTION

1. Field of the Invention

This invention relates to the use of an iron catalyst in the electrochemical gasification of carbonaceous materials in an aqueous acidic electrolyte.

2. Prior Art

It is known in the art that carbonaceous materials when mixed with an aqueous acidic electrolyte in an electrochemical cell through which a direct current passes electrochemically react oxidizing the carbonaceous material to oxides of carbon at the anode and reducing water to hydrogen or metallic ions to metallic elements at the cathode.

U.S. Pat. No. 4,268,363 teaches the electrochemical gasification of carbonaceous materials by anodic oxidation which produces oxides of carbon at the anode and hydrogen or metallic elements at the cathode of an electrolysis cell.

U.S. Pat. No. 4,226,683 teaches the method of producing hydrogen by reacting coal or carbon dust with hot water retained as water by superatmospheric pressure. The pressure is controlled by the use of an inert dielectric liquid which washes the electrodes and, while doing so, depolarizes them by absorption of the gases.

U.S. Pat. No. 4,233,132 teaches a method wherein electrodes are immersed within oil which forms a layer over a quantity of water. When current is passed between the electrodes, water is caused to undergo electrodecomposition. Gaseous hydrogen is collected in the sealed space above the oil-water layers, and the oxygen is believed to react with the constituents in the oil layer.

As acknowledged in U.S. Pat. No. 4,226,683, the principal problem in the past use of this principle for commercial production of hydrogen, was the slow rate of the electrochemical reaction of coal or carbon and water. It has now been found that iron, when added to an aqueous acidic electrolyte containing the carbonaceous material, and preferably iron in the +3 valence state, catalyzes the rate of reaction and assists in obtaining more complete oxidation for the electrochemical oxidation of the carbonaceous material at the anode thus making the commercial production of hydrogen or method of electrowinning commercially feasible.

SUMMARY OF THE INVENTION

As described above, it is well known that carbonaceous material such as coal can be oxidized at the anode of an electrochemical cell containing an aqueous acidic electrolyte with the simultaneous production of oxides of carbon at the anode and that this anodic half-cell reaction may be used in combination with the cathodic half-cell reaction of electrodeposition of a metal M from an aqueous solution of its ions $M^{m+}$. For example, focusing on the carbon in coal and representing it by C, this anodic reaction can be written according to the stoichiometry:

$$C_{(s)} + 2H_2O_{(l)} \rightarrow CO_{2(g)} + 4H^+ + 4e^- \tag{I}$$

in combination with the simultaneous cathodic reaction $$M^{m+} + me^- \rightarrow M \tag{II}$$

The net reaction, that is the sum of equations (I) and (II) [for case m=1] is:

$$C_{(s)} + 2H_2O_{(l)} + 4M^+ \rightarrow CO_{2(g)} + 4M + 4H^+ \tag{III}$$

In these equations, the symbols (g), (s) and (l) symbolize the gaseous, solid and liquid states, respectively. Equation (III), the reaction between coal and water, caused by impressing an appropriate potential on a suitable electrochemical cell, is what is referred to in U.S. Pat. No. 4,268,363 as the electrochemical gasification of coal which reference is incorporated totally herein by reference.

In the case of copper, for example, the coal-assisted electrodeposition of copper would take the form:

$$C_{(s)} + 2H_2O_{(l)} + 2Cu^{2+} \rightarrow CO_{2(g)} + 2Cu_{(s)} + 4H^+ \tag{I}$$

A problem with this prior art method is the relatively slow rate of reaction and the incomplete combustion of the carbonaceous material at the anode.

It has now been found that the addition of a sufficient amount of iron in the elemental, +2 or +3 valence state or mixtures thereof, to the carbonaceous material undergoing oxidation in an aqueous electrolyte at the anode will increase the rate of reaction of the oxidation process. The iron catalyst assists the oxidation of carbonaceous material in going to completion and increases the amount of current produced at the anode per given operating voltage.

DETAILED DESCRIPTION

The carbonaceous materials suitable for use in accordance with the present invention include a wide variety of material such as bituminous coal, chars made from coal, lignite, peat, active carbons, coke, carbon blacks, graphite; wood or other lignocellulosic materials including forest products, such as wood waste, wood chips, sawdust, wood dust, bark, shavings, wood pellets; including various biomass materials as land or marine vegetation or its waste after other processing, including grasses, various cuttings, crops and crop wastes, coffee grounds, leaves, straw, pits, hulls, shells, stems, husks, cobs and waste materials including animal manure; sewage sludge resulting from municipal treatment plants, and plastics or the scraps or wastes formed in the production of plastic such as polyethylene, cellulose acetate and the like. Thus, it is seen that substantially any fuel or waste material whether a liquid, such as oil, a gas, such as methane or other hydrocarbon or waste material containing carbon, with the exception of $CO_2$, provides a suitable source of carbonaceous material for use according to this invention.

The particular apparatus used to carry out the electrolytic oxidation of carbonaceous materials is not critical. Substantially, the same apparatus and techniques that are utilized in the electrolytic deposition of metals as well as those described in U.S. Pat. No. 4,268,363, which reference is incorporated herein by reference, can be used with the method of this invention. Any selection of appropriate changes in use of materials and/or technique is well within the skill of those versed in the art to which this invention applies.

The cells described in U.S. Pat. No. 4,268,363 including the use of acidic aqueous electrolyes, selection of anode and cathode materials and the optional but preferred use of cell membranes to keep the carbonaceous material on the anode side are most preferred.

While the electrode materials described in U.S. Pat. No. 4,268,363 are suitable for use in the method of this invention, anode materials which were found to perform especially well include a mixture of $RuO_2/TiO_2$ on a Ti substrate and a mixture of $IrO_2/TiO_2$ on a Ti substrate, which anodes are both commercially available.

The preferred acidic aqueous electrolytes that can be employed have a pH of less than 3 and include solutions of strong acids such as sulfuric acid, nitric acid, hydrochloric acid, phosphoric acid and the like.

While temperatures from above the freezing point of water and greater may be used, temperatures of from about 25° C. to 350° C. are preferred. Temperatures of from 120° C. to 300° C. are most preferred especially when using solid carbonaceous materials such as coal. At temperatures below 140° C. the reactivity of solid carbonaceous materials such as coal steadily decreases as the electrochemical oxidation proceeds. This decreased reactivity is believed to be caused by surface oxides building on the surface of the coal which hinders further sustained reactivity of the coal. At temperatures of about 140° C. and greater, the reactivity of the coal is sustained and no substantial decrease is observed.

Since it is desired to maintain the reaction in a liquid phase, it is of course necessary, that at elevated temperatures, the reaction be carried out at elevated pressure. Generally, pressures of from about 2 to 400 atmospheres are satisfactory.

It has also been found that the addition of the iron catalyst to a solid carbonaceous material such as coal will sustain the activity of the coal longer at temperatures below 120° C. as compared to systems not containing the iron catalyst. Also, the catalytic effects of the iron catalyst are more pronounced at the higher temperatures.

While iron may be used in its elemental state, iron in its +2 and +3 valence, i.e. ferrous and ferric states, respectively, are preferred. Most preferred is the use of iron in the +3 valence state. Thus, inorganic iron compounds such as iron oxides, iron carbonate, iron silicates, iron sulfide, iron oxide, iron hydroxide, iron halides, iron sulfate, iron nitrate, and the like, may be used. Also, various organic iron salts and complexes, such as salts of carboxylic acids, e.g., iron acetates, iron citrates, iron formates, iron glyconates, and the like, iron cyanide, iron chelate compounds, such as chelates with diketones as 2,4-pentanedione, iron ethylenediaminetetracetic acid, iron oxalates, and the like.

While the iron catalyst may be used at a concentration up to the saturation point in the aqueous electrolyte, the preferred range of iron catalyst is in the range of from 0.04 to 0.5 molar and most preferably from 0.05 to 0.1 molar concentration.

While certain carbonaceous material, such as coal, may contain iron as an impurity, an iron-containing catalyst from an external source is generally required in order to increase the rate of reaction, at least initially to acceptable levels for commercial use. The iron catalyst can conceivably be generated in-situ by oxidizing sufficient iron-containing coal to generate an effective amount of iron catalyst in the electrolyte.

Of course, essentially iron-free carbonaceous materials, such as carbon black, requires an iron catalyst to be added from an external source.

Thus, in one embodiment of this invention, sufficient iron catalyst is added from an external source in order to supply the preferred range of catalyst, namely, 0.04 to 0.5 molar.

In a second embodiment, an effective amount of iron catalyst can be generated in-situ by oxidizing sufficient iron-containing coal, albeit initially at a slower rate, to supply the preferred range of catalyst.

The catalyst generated would then be freed from the coal and be able to function in a similar manner as externally-supplied iron catalyst.

In a third embodiment, a combination of externally-supplied iron catalyst and in situ generated catalyst can be used to supply the preferred range of catalyst, i.e., 0.04 to 0.5 molar.

The concentration or amount of carbonaceous material present in the electrolyte may vary over a wide range depending upon whether it is a liquid, solid or gas and depending on particle size, however, the preferred range is from about 0.1 gm to 0.7 gm per ml.

As in the case described in U.S. Pat. No. 4,268,363, it is possible to electrowin, electroplate or electrodeposit any element that can be cathodically reduced from aqueous solution with simultaneous electrochemical anodic oxidation of carbonaceous material. Typical metallic elements often deposited in practice from aqueous electrolyte include, Cr, Mn, Co, Ni, Pb, Cu, Sn, Zn, Ga, Hg, Cd, Ir, Au, Ag, Os, Rh, Ru, Ir, Pd and Pt. Preferably the metallic elements are Cu, Zn, Ag, Ni, and Pb.

The following examples will serve to illustrate the invention.

EXAMPLES

EXAMPLE I

Electrodeposition of Cu was conducted at constant voltage in a cell with a Nafion ™ membrane and catholyte and anolyte solutions being pumped.

The anolyte in this first embodiment contained no coal and no added iron and was pumped through an external circulation system. The catholyte was pumped through a system similar to the anolyte. Aqueous electrolyte was 0.5 M $H_2SO_4$ with the cathode also containing 0.5 M in $CuSO_4$. Total volume was 500 ml; temperature was run at 95° C. and 120° C.; anode was 55 cm$^2$ of iridium oxide/titanium dioxide (TIR) coated titanium; cathode was copper sheet.

| 95° C. | | 120° C. | |
| --- | --- | --- | --- |
| Cell Potential (V) | Current (mA) | Cell Potential (V) | Current (mA) |
| 1.25 | 370 | 1.22 | 600 |
| 1.00 | 9 | 1.00 | 35 |

EXAMPLE II

Apparatus and conditions were the same as those in Example I except that the pumped anolyte contained 0.5 g/cm$^3$ of coal (WOW 3932). The results were as follows:

| 95° C. | | 120° C. | |
| --- | --- | --- | --- |
| Cell Potential (V) | Current (mA) | Cell Potential (V) | Current (mA) |
| 0.40 | 103 | 0.40 | 170 |
| 0.60 | 330 | 0.60 | 520 |
| 1.00 | 370 | 1.00 | 627 |

EXAMPLE III

In the third experiment the conditions and apparatus were the same as in Example II except that the anolyte was made 0.04 M in $Fe^{3+}$ by the addition of $Fe_2(SO_4)_3$. Results were as follows:

| 95° C. | | 120° C. | |
|---|---|---|---|
| Cell Potential (V) | Current (mA) | Cell Potential (V) | Current (mA) |
| 0.40 | 180 | 0.40 | 370 |
| 0.60 | 530 | 0.60 | 1140 |
| 1.00 | 620 | 0.65 | 1310 |

At 120° C. the $Fe^{3+}$ concentration was increased to 0.1 M with all other conditions and apparatus remaining constant. The results were:

| 120° | |
|---|---|
| Cell Potential (V) | Current (mA) |
| 0.35 | 260 |
| 0.40 | 418 |
| 0.60 | 1230 |

What is claimed is:

1. In the electrochemical method of electrowinning a metallic element from an aqueous acidic electrolyte containing a metallic component as a cationic component comprising the steps of:
introducing carbonaceous materials and said electrolyte into an electrolysis cell having a cathode electrode and an anode electrode; and applying an electromotive force across said electrodes; wherein said carbonaceous materials react at said anode and said metallic component is deposited at said cathode, the improvement which comprises adding an amount of iron in its elemental, +2 or +3 valence state, or mixtures thereof to the electrolyte containing the carbonaceous material sufficient to increase the rate of oxidation of the carbonaceous material at the anode.

2. The method according to claim 1 wherein the iron is present as a salt in a +2 or +3 oxidation state.

3. The method according to claim 1 wherein the electrochemical process is conducted at a temperature of from about 25° C. to 350° C.

4. The method according to claim 3 wherein the temperature is in the range of from about 120° C.–300° C.

5. The method according to claim 3 wherein the iron catalyst is present at a concentration of from about 0.04 to 0.5 molar.

6. The method according to claim 5 wherein the iron catalyst is present at a concentration of from about 0.05 to 0.1 molar.

7. The method according to claim 1 wherein said carbonaceous materials are selected from the group consisting of coal, lignite, peat, char, coke, charcoal, soot, carbon black, activated carbon, asphalt, graphite wood, biomass materials or sewage sludge.

8. The method according to claim 1 wherein the aqueous electrolyte is acidic having a pH of 3 or less.

9. The method according to claim 1 wherein said metallic element is selected from the group consisting of Cr, Mn, Co, Ni, Pb, Cu, Sn, Zn, Ga, Hg, Cd, Au, Ag, Os, Rh, Ru, Pd, or Pt.

10. The method according to claim 9 wherein said metallic element is copper, zinc, silver, nickel or lead.

* * * * *